United States Patent [19]
Fannin

[11] 3,834,412
[45] Sept. 10, 1974

[54] COMBINED FILL, PRESSURE RELIEF AND BLEED VALVE ASSEMBLY FOR PRESSURE VESSELS

[75] Inventor: Wayne V. Fannin, Xenia, Ohio

[73] Assignee: General Motors Corporation, Detroit, Mich.

[22] Filed: June 25, 1973

[21] Appl. No.: 373,389

[52] U.S. Cl........... 137/68, 280/150 AB, 220/89 A, 141/18, 137/588
[51] Int. Cl...................... F16k 17/16, F16k 45/00
[58] Field of Search......... 137/68, 70, 71, 321, 322, 137/493, 493.2, 493.9, 588, 493.1; 141/2, 18; 220/27, 89 A, 89 B; 280/150 AB

[56] References Cited
UNITED STATES PATENTS

| | | | |
|---|---|---|---|
| 2,632,462 | 3/1953 | Selwyn | 137/71 |
| 2,989,091 | 6/1961 | Lowenthal | 141/18 |
| 3,495,622 | 2/1970 | Rose | 137/588 |
| 3,693,644 | 9/1972 | DiLorenzo | 137/71 |
| 3,780,768 | 12/1973 | Soderstrom | 141/18 |

*Primary Examiner*—William R. Cline
*Assistant Examiner*—George L. Walton
*Attorney, Agent, or Firm*—Herbert Furman

[57] ABSTRACT

A combined fill, pressure relief, and bleed valve assembly for pressure vessels includes a valve portion having a valve housing threaded within a threaded bore in the wall of the pressure vessel and mounting a valve member biased to closed position against a valve seat of the housing. The valve member can be unseated to conventionally fill the pressure vessel. A pressure relief and bleed portion includes a second housing having a hollow body threaded exteriorly and interiorly and a head provided with an outlet. A plurality of bleed grooves on the exterior of the body open to the inner end of the body and to the head. A hollow plug is threaded within the body and seats a pressure rupturable diaphragm against the inner surface of the head to close the outlet. The body is threaded into the bore after filling. The inner end of the body seats on the valve housing to close the inner ends of the bleed grooves and the head seats on the wall to close the outer ends of the bleed grooves. An extension of the plug unseats the valve member to permit pressure fluid to flow through the plug to the pressure rupturable diaphragm. A partial unthreading of the body insufficient to disengage the extension from the valve member unseats the inner end of the housing from the valve housing and the head from the pressure vessel wall to permit the bleed grooves to bleed pressure fluid to atmosphere.

5 Claims, 4 Drawing Figures

PATENTED SEP 10 1974 3,834,412

COMBINED FILL, PRESSURE RELIEF AND BLEED VALVE ASSEMBLY FOR PRESSURE VESSELS

This invention relates generally to a combined fill, pressure relief, and bleed valve assembly for pressure vessels and more particularly to such an assembly which includes a fill valve portion permitting the pressure vessel to be conventionally filled with pressure fluid and a subsequently installed second portion providing the bleed and pressure relief functions.

In the preferred embodiment, the fill valve portion includes a valve member biased to closed position. The fill valve portion is initially installed in a bore of the pressure vessel wall and permits filling of the pressure vessel in a conventional manner. The second portion of the valve assembly is then installed and provides the pressure relief and bleed functions. When the second portion is installed, it unseats the valve member from its valve seat to subject a pressure rupturable diaphragm of this portion to the pressure fluid and thereby provide the pressure relief function. The second portion also includes bleed passages which are closed when the second portion is fully inserted within the bore of the pressure vessel but which are opened when the second portion is partially withdrawn to permit pressure fluid to bleed to atmosphere through the bleed passages while maintaining the valve member unseated from the valve seat.

One of the features of this invention is that it provides a combined fill, pressure relief, and bleed valve assembly including a first portion providing the fill function and installable within an opening in the pressure vessel wall to permit filling of the pressure vessel in a conventional manner, and a second portion installed after the pressure vessel is filled and providing the pressure relief and bleed functions. Another feature of this invention is that the pressure relief function is provided by a pressure rupturable outlet in the second portion, with this outlet being subjected to pressure fluid from the pressure vessel by maintaining a valve member in the first portion unseated when the second portion is installed. A further feature of this invention is that the bleed function is provided by bleed grooves in the second portion which are sealed when the second portion is installed but which can be opened upon a partial removal of the second portion while maintaining the valve member unseated.

These and other features of this invention will be readily apparent from the following specification and drawings wherein.

Figure 1:
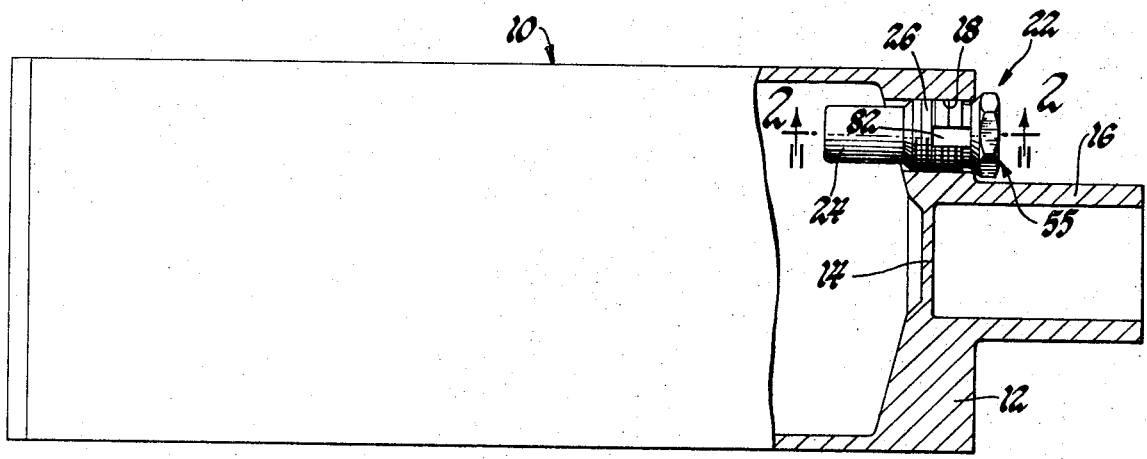
FIG. 1 is a partially broken away view of a conventional pressure vessel having a combined fill, pressure relief, and bleed valve assembly according to this invention.

Referring now particularly to FIG. 1 of the drawings, a conventional pressure vessel designated 10 includes an integral end wall 12 which is provided with an integral rupturable diaphragm 14 for communicating the interior of the pressure vessel to an outlet 16. The pressure vessel 10 forms no part of this invention and it is not believed that any further details of the vessel are necessary or required for an understanding of this invention. The pressure 10, for example, may form part of an inflatable occupant restraint system either of the so-called pure gas type or of the augmented type, both of which are known to those skilled in the art. In such a system, the outlet 16 would be communicated with a manifold and a diffuser to inflate an inflatable occupant restraint cushion from the diffuser when the diaphragm 14 is ruptured. The pressure vessel 10 may likewise form part of an energy absorbing bumper strut which includes an apertured piston movable within the pressure vessel to absorb energy when a bumper secured to the piston is subjected to impact loading.

The wall 12 of the pressure vessel includes a partially threaded bore 18. As shown in detail in FIG. 2, the outer end of bore 18 is counterbored to remove the threads and is provided with a chamfered edge or seat 20.

A combined fill, pressure relief, and bleed valve assembly 22 is mounted within the bore 18 to permit filling of the pressure vessel 10 with pressure fluid and provide the pressure vessel with a pressure relief outlet as well as provide for bleed of the pressure fluid from the vessel whenever desired.

Figure 2:
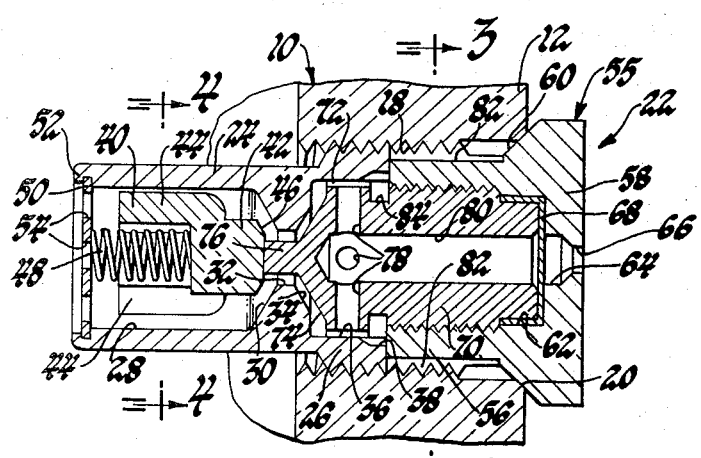
FIG. 2 is an enlarged sectional view taken generally along the plane indicated by line 2—2 of FIG. 1.
Figure 4:
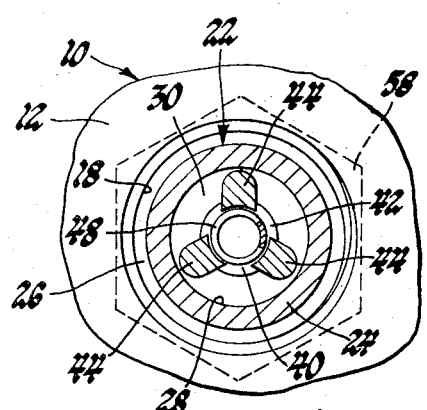
FIG. 4 is a sectional view taken generally along the plane indicated by line 4—4 of FIG. 2.

As shown in FIGS. 2 and 4 of the drawings, the valve assembly 22 includes a first valve portion having a cylindrical valve housing 24 provided with a threaded outer end portion 26 to permit adjustable mounting of the valve housing within the bore 18. The housing 24 further includes an inner cylindrical bore 28 which merges into a tapered or frustoconical valve seat 30. Seat 30 opens to an axial bore 32 which in turn opens to a tapered or frustoconical bore 34 of opposite hand to the valve seat 30. Bore 34 opens to a cylindrical bore 36 which is provided with a plurality of shallow grooves 38 adjacent the outer end thereof.

A valve member 40 is slidably mounted within bore 28 and includes a body portion 42 and three integral flutes 44 extending longitudinally therefrom. The body portion 42 includes a surface 46 which is complementary to the seat 30 and seats thereagainst when the valve member 40 is in closed position. A coil compression spring 48 extends between the flutes 40 and seats on the body portion and also a retainer plate 50 to normally bias the valve member 40 to the right to closed position. The plate 50 is retained within the counterbored inner end of the housing 24 by crimping a flange 52 of the housing over the plate. The plate is provided with a plurality of apertures 54 to permit passage of the pressure fluid from the interior of the pressure vessel into the housing 24.

The housing 24 is threaded into the bore 18 by use of suitable tool engaging grooves 38. The valve member 40 is biased to a closed position by the spring 48. The pressure vessel can then be filled in a conventional manner and through conventional equipment by unseating the valve member against the bias of the spring 48 to permit the pressure fluid to flow into the pressure vessel. After filling, the valve member 40 is biased closed by spring 48.

Figure 3:
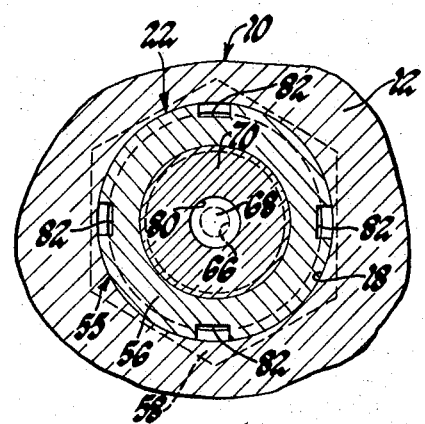
FIG. 3 is a sectional view taken generally along the plane indicated by line 3—3 of FIG. 2.

The assembly 22 further includes a second pressure relief and bleed portion having a cylindrical housing 55 including a body portion 56 provided with a threaded exterior and interior and an integral head portion 58 of hexagon exterior shape as can be seen in FIG. 3. The head portion 58 merges into the threaded exterior of the body portion across an exterior seat or conical wall 60 and merges into the threaded interior of the body portion across a stepped series of bores 62, 64, and 66, the latter two of which provide an outlet through the head portion as will be apparent from a further description.

A cup-shaped pressure rupturable diaphragm 68 fits within the bore 62 and is retained therein by the outer cylindrical end of a hollow plug member 70 which is threaded within the body portion 56 and seats the base wall of the diaphragm to the base wall of the bore 62. The plug member 70 includes an inner hollow head portion 72 of outer hexagonal shape and provided with a conical wall 74 and a cylindrical extension or abutment 76. A radial passage 78 opens through each of the flats of the portion 72 to the interior bore 80 of the plug member. Bore 80 is closed at its inner end by wall 74 and opens at its outer end to diaphragm 68.

As best shown in FIG. 3, the outer surface of the body portion 56 is provided with four longitudinally extending bleed grooves 82 which extend from the inner end of the body portion 56 to the wall 60 of the head portion 58.

After the pressure vessel has been filled, the second portion of the valve assembly, which has been preassembled, is threaded into the bore 18 until the inner end of the body portion 56 seats on the outer end of the housing 24 and the wall 60 of head portion 58 seats on the seat 20. This closes the inner and outer ends of the grooves 82 to the housing 24 and to the head portion 58. Grooves 38 provide for adjustment of the first portion of the assembly to permit this seating of the second portion to housing 24 and wall 20. The abutment 76 engages the body portion 42 of valve member 40 and unseats the valve member so that pressure fluid from the pressure vessel can flow around the head portion 72 and through the bore 78 and 80 to the diaphragm 68 to subject this diaphragm to the pressure of the fluid within the pressure vessel. Should this pressure rise above a preset or predetermined minimum, the diaphragm 68 will rupture to release the contents of the pressure fluid to atmosphere through the outlet defined by bores 64 and 66.

Should it be desired to bleed pressure fluid from the pressure vessel, the housing 55 is partially unthreaded from the bore 18 by use of a suitable tool engaging head portion 58. This opens the inner ends of the grooves 82 to pressure fluid by unseating the inner end of the housing 55 from the outer end of housing 24 and opens the outer ends of the grooves to atmosphere by unseating the wall 60 of head portion 58 from the seat 60. The valve member 40 remains unseated. The flow of the pressure fluid to grooves 82 is aided by grooves 38 and a peripheral groove 84 in the head portion 72.

Thus, this invention provides a combined fill, pressure relief, and bleed valve assembly.

I claim:

1. In combination with a pressure vessel having a bore through a wall thereof, a fill, pressure relief, and bleed valve assembly, comprising, a valve housing mounted within the bore and including a valve seat opening through the bore to atmosphere, a valve member slidably received within the housing, resilient means seating the valve member on the valve seat to close the valve seat to atmosphere, the valve member being unseatable from the valve seat to fill the pressure vessel with pressure fluid, a second housing inserted within the bore after filling and including a bleed passage communicable with the valve seat and atmosphere and a pressure rupturable outlet, means sealing the bleed passage upon insertion of the second housing within the bore, means on the second housing unseating the valve member against the action of the resilient means upon insertion of the second housing within the bore to open the valve seat to the second housing and subject the pressure rupturable outlet to the pressure fluid within the vessel, and means operative upon a partial withdrawal of the second housing from the bore to open the bleed passage to the valve seat and to atmosphere.

2. In combination with a pressure vessel having a bore through a wall thereof, a fill, pressure relief, and bleed valve assembly, comprising, a valve housing mounted within the bore and including a valve seat opening through the bore to atmosphere, a valve member slidably received within the housing, resilient means seating the valve member on the valve seat to close the valve seat to atmosphere, the valve member being unseatable from the valve seat to fill the pressure vessel with pressure fluid, a second housing inserted within the bore after filling and including a body portion having a bleed passage therethrough communicable with the valve seat at the inner end thereof and with the atmosphere at the outer end thereof, and a pressure rupturable outlet, means sealing the ends of the bleed passage upon insertion of the second housing within the bore, means on the second housing for unseating the valve member against the action of the resilient means upon insertion of the second housing within the bore to open the valve seat to the second housing and subject the pressure rupturable outlet to the pressure fluid within the vessel, and means operative upon a partial withdrawal of the second housing from the bore to open the ends of the bleed passage and bleed pressure fluid from the valve seat to atmosphere.

3. In combination with a pressure vessel having a bore through a wall thereof, a fill, pressure relief, and bleed valve assembly, comprising, a valve housing mounted within the bore and including a valve seat opening through the bore to atmosphere, a valve member slidably received within the housing, resilient means seating the valve member on the valve seat to close the valve seat to atmosphere, the valve member being unseatable from the valve seat to fill the pressure vessel with pressure fluid, a second housing inserted within the bore after filling and including a hollow body portion having at least one external groove therethrough providing a bleed passage, and a head portion at the outer end of the body portion and of the groove provided with a pressure rupturable outlet closing the interior of the body portion, the inner end of the bleed passage sealing to the valve housing and the head portion sealing to the wall upon insertion of the second housing within the bore to close the bleed passage, and means on the second housing unseating the valve member against the action of the resilient means upon insertion of the second housing within the bore to open the valve seat to the interior of the second housing and subject the pressure rupturable outlet to the pressure fluid within the vessel, a partial withdrawal of the second housing from the bore opening the inner end of the bleed passage to the valve seat and the outer end thereof to atmosphere to bleed pressure fluid from the pressure vessel.

4. In combination with a pressure vessel having a threaded bore through a wall thereof, a fill, pressure relief, and bleed valve assembly, comprising, a valve housing mounted on the vessel and including a valve seat opening to atmosphere through the bore, a valve member slidably received within the housing, resilient means seating the valve member on the valve seat to close the valve seat to atmosphere, the valve member being unseatable from the valve seat to fill the pressure vessel with pressure fluid, a second housing having a hollow threaded body provided with at least one external longitudinally extending bleed groove opening to the inner end thereof and a head portion at the outer end of the body and overlying the outer end of the groove, the head portion including a pressure rupturable outlet opening to the body portion, the second housing being threadable within the bore after filling, with the head portion thereof seating on the wall at the outer end of the bore to close the outer end of the bleed groove and the inner end of the body thereof seating on the valve housing to close the inner end of the bleed groove, and means on the second housing engaging and unseating the valve member upon insertion of the second housing into the bore, a partial withdrawal of the second housing insufficient to disengage the means from the valve member unseating the inner end of the body from the valve housing and unseating the head portion from the wall to bleed pressure fluid from the valve seat to atmosphere through the groove.

5. In combination with a pressure vessel having a bore through a wall thereof, a fill, pressure relief, and bleed valve assembly, comprising, a valve housing mounted within the bore and including a valve seat, a valve member slidably received within the housing, resilient means seating the valve member on the valve seat to close the valve seat to atmosphere, the valve member being unseatable to fill the pressure vessel with pressure fluid, a second housing having an outer head portion provided with an outlet and a hollow body provided with at least one external longitudinally extending bleed groove opening to the inner end of the body and to the head portion, a pressure rupturable diaphragm closing the outlet, a plug member inserted within the body and seating the diaphragm to the head portion, the plug member including an abutment portion extending beyond the body portion, the second housing being insertable within the bore with the head portion thereof seating on the wall at the outer end of the bore to close the outer end of the bleed groove and the inner end of the body thereof seating on the valve housing to close the inner end of the bleed groove, the abutment portion of the plug member engaging and unseating the valve member upon insertion of the second housing into the bore, a partial withdrawal of the second housing insufficient to disengage the abutment portion from the valve member unseating the inner end of the second housing from the valve housing and unseating the head portion from the wall to open the bleed groove and bleed pressure fluid from the valve seat to atmosphere.

* * * * *